(No Model.)
C. M. SPENCER.
DENTAL HAND PIECE.
No. 511,029. Patented Dec. 19, 1893.
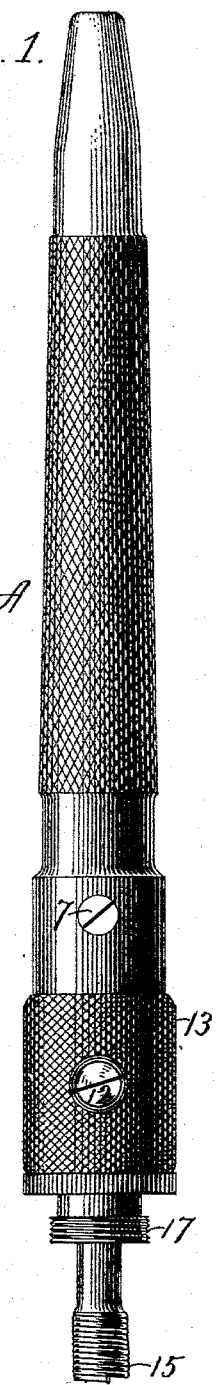
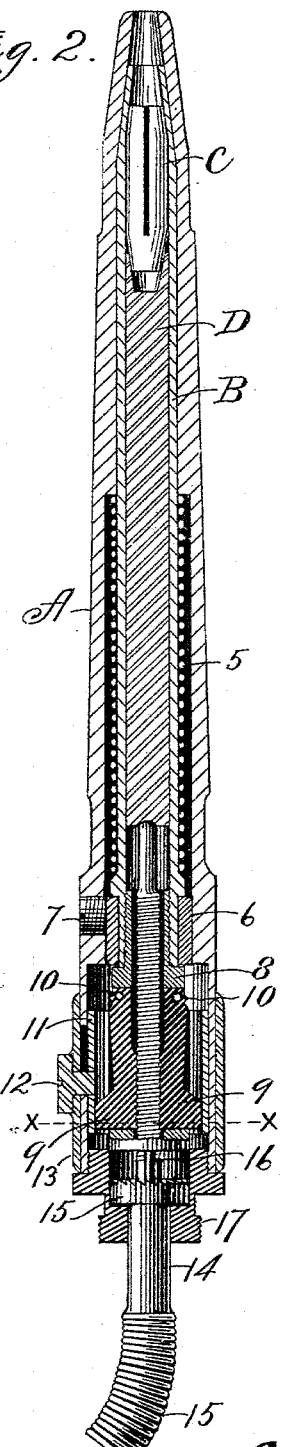
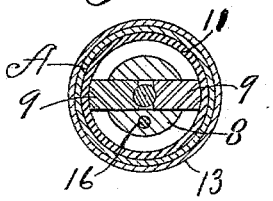
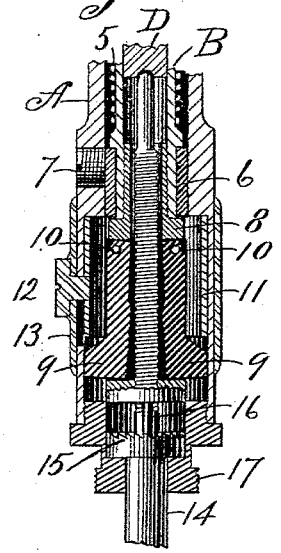
Witnesses
G. W. Stipek
C. Darwin Loomis Jr.
Inventor
Christopher M. Spencer
By James Shepard
Atty.

UNITED STATES PATENT OFFICE.

CHRISTOPHER MINER SPENCER, OF WINDSOR, CONNECTICUT.

DENTAL HAND-PIECE.

SPECIFICATION forming part of Letters Patent No. 511,029, dated December 19, 1893.

Application filed September 27, 1893. Serial No. 486,628. (No model.)

*To all whom it may concern:*

Be it known that I, CHRISTOPHER MINER SPENCER, a citizen of the United States, residing at Windsor, in the county of Hartford and State of Connecticut, have invented certain new and useful Improvements in Dental Hand-Pieces, of which the following is a specification.

My invention relates to improvements in dental hand pieces, and the objects of my improvement are simplicity of construction and general convenience and efficiency in operation.

In the accompanying drawings: Figure 1 is a side elevation of my hand piece. Fig. 2 is a longitudinal section thereof, some of the parts being shown in elevation. Fig. 3 is a transverse section on the line $x$ $x$ of Fig. 2, and Fig. 4 is a central longitudinal section of a portion of my hand piece with the parts in a different position.

A designates the outer sleeve or case, B the inner sleeve, C the split jaws and D the follower or plug for operating the jaws. A spiral spring 5 is arranged between the outer and inner sleeves for the purpose of creating sufficient friction to prevent the inner sleeve from revolving while the chuck jaws are being closed. The inner sleeve B is shouldered near the end that is opposite the split jaws and is held within the outer sleeve or case by means of the collar 6, which collar is held in place by means of the set screw 7. A cylindrical heel piece 8 is screwed into the heel of the inner sleeve B so as to become rigid therewith and revolve with it, which heel piece is slotted diametrically to receive the half nuts 9 that are preferably hinged within said cylindrical heel piece, as at 10. Within the outer sleeve or case A adjacent to these half nuts is a sliding sleeve 11, the same being connected by means of the screw 12 with the slide 13 on the outside of the case at its heel. The outer edges of the half nut are shaped as shown in Figs. 2 and 4 so that when the sliding sleeve 11 is in the position shown in Fig. 4, the half nuts may spread apart as therein shown and release their hold on the screw spindle 14 and when the sleeve is pushed back over the greatest projection of said half nuts, said nuts are closed upon the screw spindle 14, as shown in Fig. 2. Of course the outer sleeve or case A is slotted longitudinally to permit this movement of the sliding sleeve 11 and slide 13 when they are connected by the screw 12 and this slot may have a lateral portion so that by a slight rotation of the slide it may be locked against longitudinal movement as in many analogous structures. The screw spindle 14 is driven by a flexible cable 15 in the ordinary manner of dental hand pieces. When the slide 11 is in the position shown in Fig. 4 this screw spindle is free to revolve without driving the other parts as the threads of the half nuts are disengaged with the screw of said spindle. When the slide 11 is brought over the outer jaws of the half nuts to make them engage the threads of the screw spindle, the spindle is immediately screwed through said half nuts sufficiently to press its end against the plug or follower D for closing the spring jaws C and as soon as said jaws are firmly closed, the parts are revolved with said screw spindle. The more resistance there is to the revolution of the drill or chuck jaws the tighter will the jaws hold. This mode of operation of course is applicable only to the revolution of the screw spindle in a forward direction. Sometimes it is desirable to revolve the hand piece backwardly. I provide for this by securing the ratchet disk 15 to the drill spindle and placing a sliding pawl 16 in the end of the heel piece to engage said ratchet disk and drive the hand piece backwardly. Of course the jaws will first be closed by driving the drill forward in the manner first described. The ordinary flexible covering for the cable may be secured to the threaded collar 17.

I claim as my invention—

1. The combination of case, jaws, sleeve and follower, with the half nuts, the screw spindle, and devices for opening and closing said half nuts, substantially as described and for the purpose specified.

2. The combination of case, jaws, sleeve and follower, with the half nuts, the screw spindle, devices for opening and closing said half nuts, the ratchet disk 15 and pawl 16, substantially as described and for the purpose specified.

3. The combination of the case A, sleeve B, the jaws, the follower, the collar 6 and screw 7 for holding the parts within said case, the half nuts and the screw spindle at the heel end of the sleeve B, and devices for opening and closing said half nuts, substantially as described and for the purpose specified.

4. The combination of the case A, sleeve B, the jaws, the follower, the half nuts and screw spindle at the heel end of the sleeve B, means for holding said sleeve against longitudinal movement within the case, the sliding sleeve 11 within said case and the slide 13 on the outside of said case, substantially as described and for the purpose specified.

CHRISTOPHER MINER SPENCER.

Witnesses:
JAMES SHEPARD,
A. W. STIPEK.